July 7, 1925.
E. LESCHHORN
1,544,766
COMBINATION CLUTCH AND BRAKE MECHANISM FOR PERFORATING MACHINES
Filed Feb. 29, 1924 3 Sheets-Sheet 1
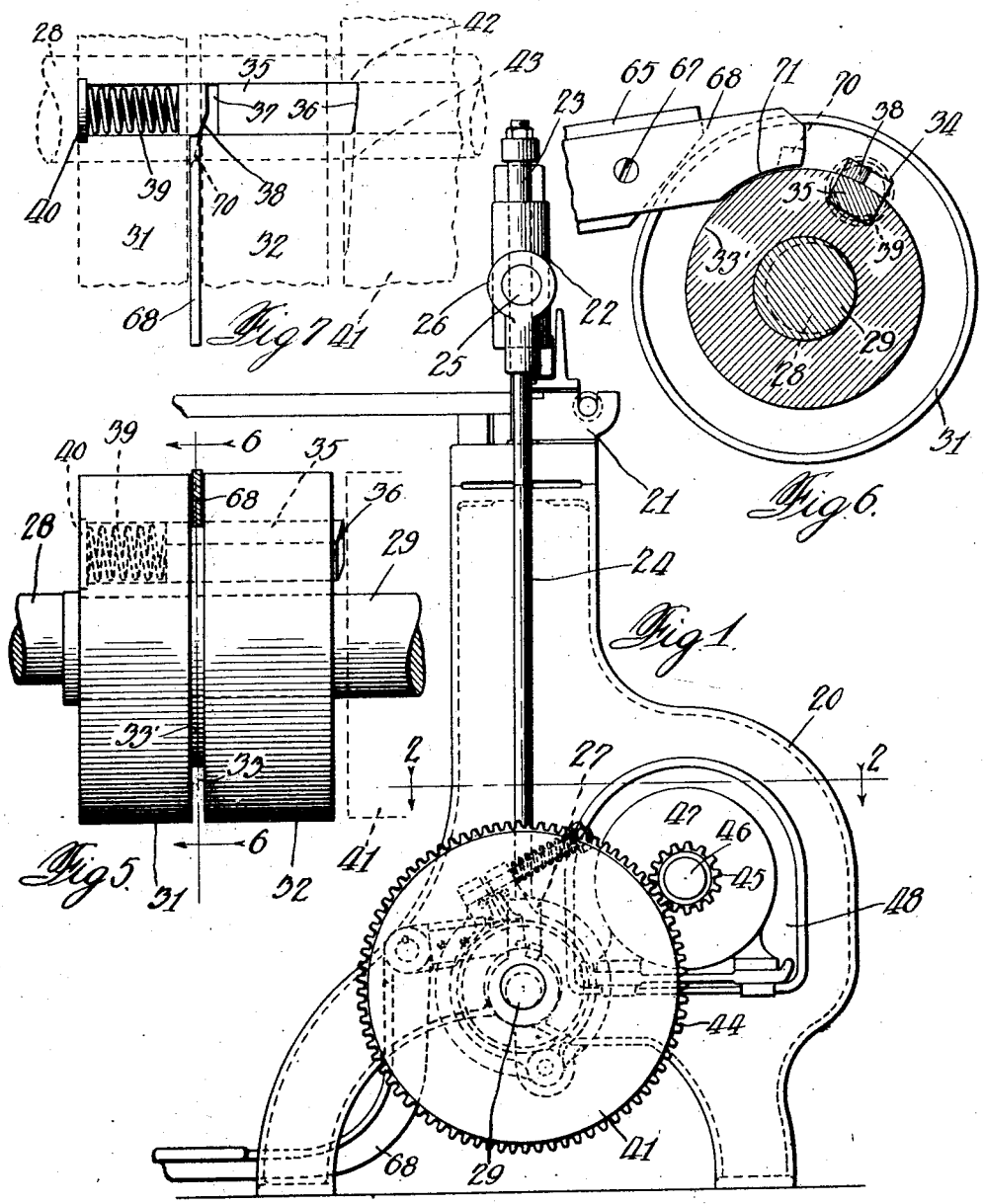
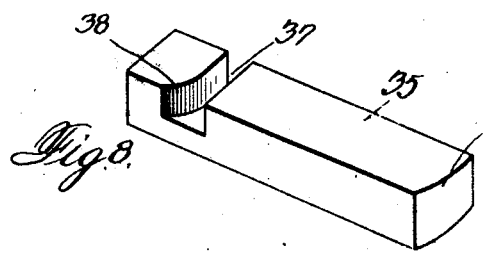
Inventor:
Ernest Leschhorn.
By Sprinkle & Smith
Attys.

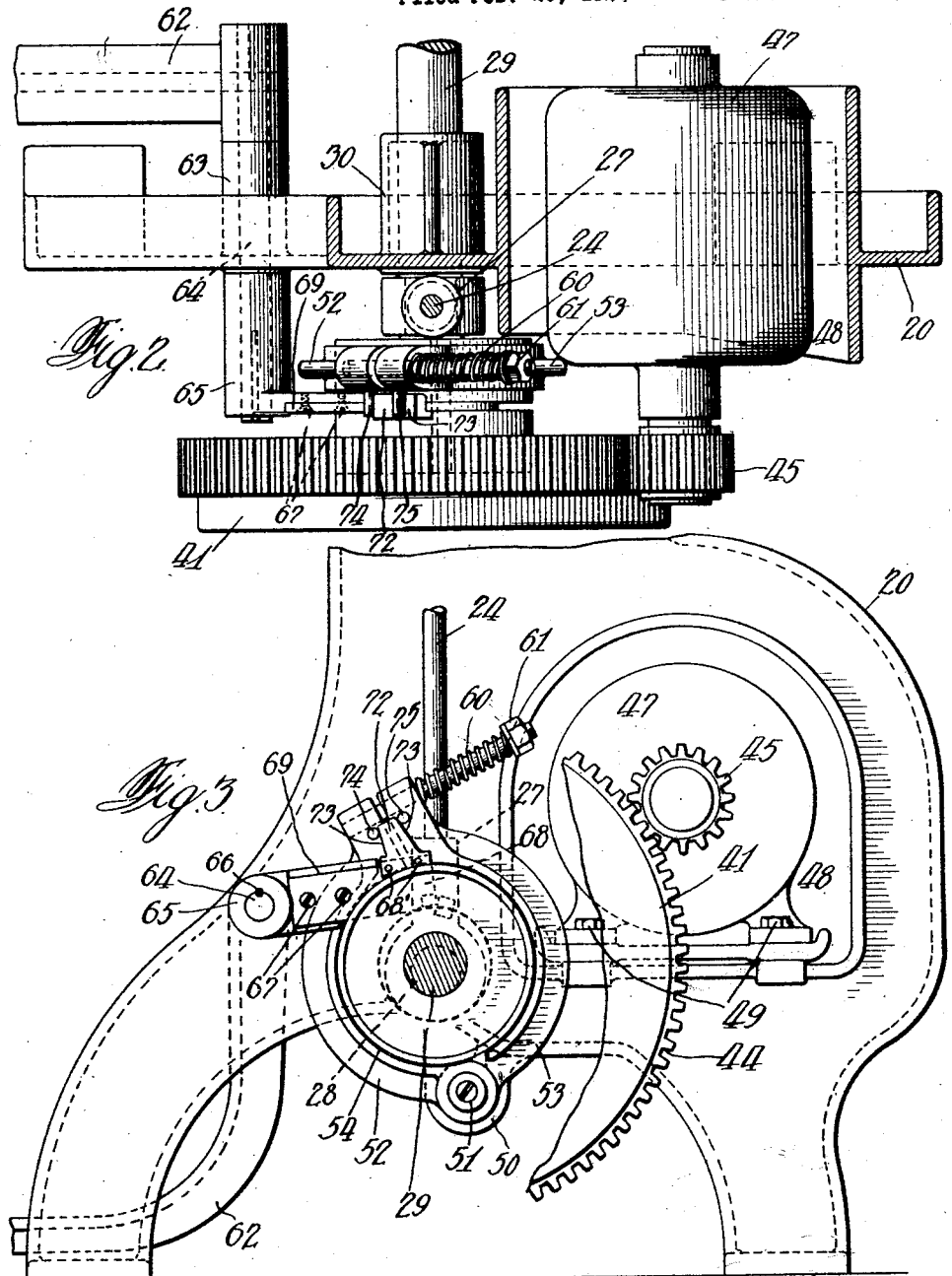

July 7, 1925. 1,544,766
E. LESCHHORN
COMBINATION CLUTCH AND BRAKE MECHANISM FOR PERFORATING MACHINES
Filed Feb. 29, 1924 3 Sheets-Sheet 3
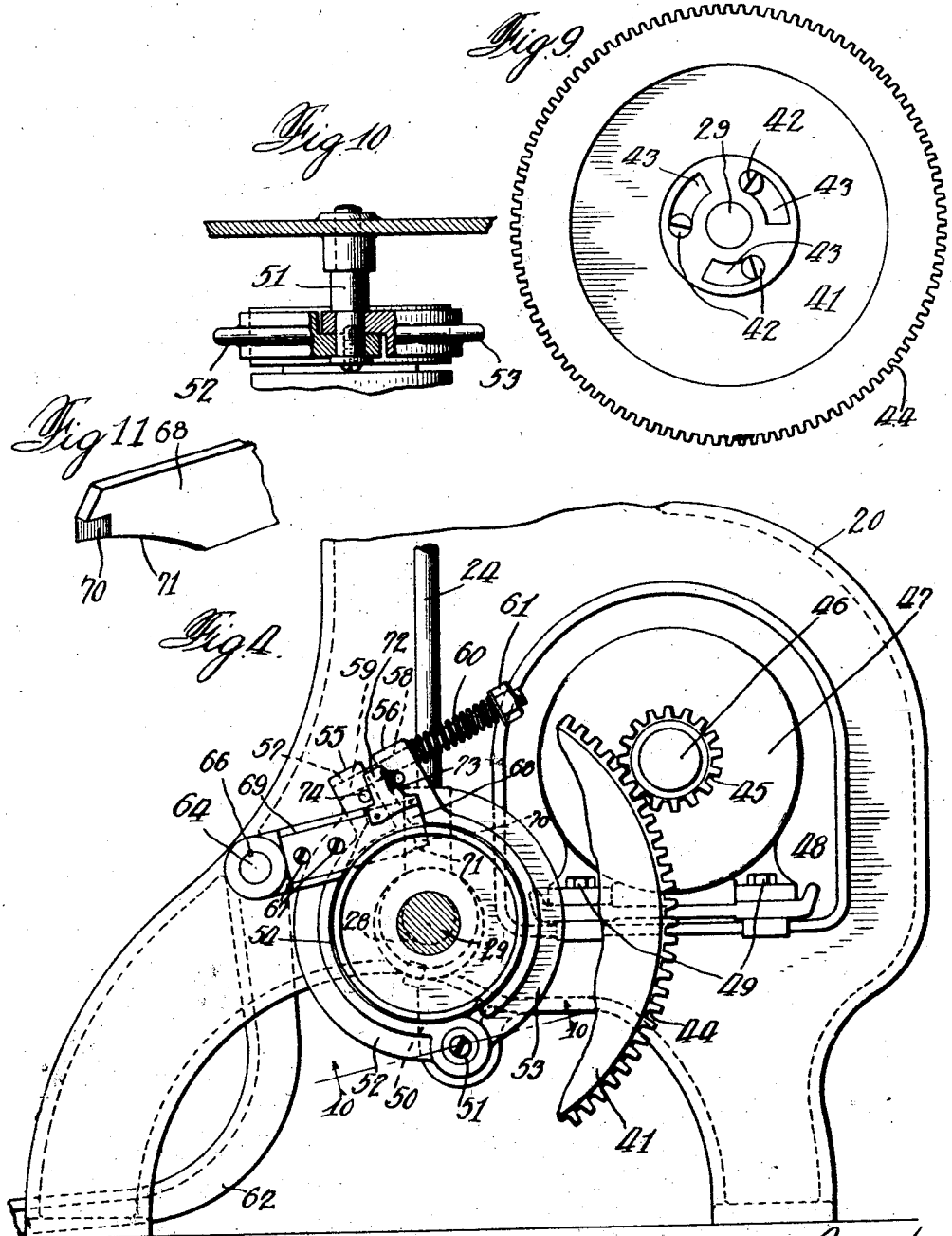

Patented July 7, 1925.

1,544,766

UNITED STATES PATENT OFFICE.

ERNEST LESCHHORN, OF CHICAGO, ILLINOIS, ASSIGNOR TO LATHAM MACHINERY COMPANY, A CORPORATION OF ILLINOIS.

COMBINATION CLUTCH AND BRAKE MECHANISM FOR PERFORATING MACHINES.

Application filed February 29, 1924. Serial No. 695,892.

*To all whom it may concern:*

Be it known that I, ERNEST LESCHHORN, a citizen of the United States, residing at Chicago, in the county of Cook and State of Illinois, have invented certain new and useful Improvements in Combination Clutch and Brake Mechanism for Perforating Machines, of which the following is a specification.

This invention relates to a combination clutch and brake mechanism and more particularly to a device which is especially adapted for use in connection with perforating machines and the like.

In perforating machines and in machines where a complete cycle of operation takes place upon each actuation of the manually controlled means, it is necessary to provide a clutch mechanism and a braking mechanism so that the momentum of the moving parts of the machines will not carry these parts past their normal home position. The machines of this type in most common use at the present time are provided with a braking mechanism which continuously exerts a braking action on the moving parts of the machines. This continuous braking action is detrimental to the wearing parts and to the efficiency of the machine and places an unnecessary burden on the motor for driving the machine. In other words, a more powerful source of power or motor is required to drive this machine by reason of the unnecessary friction caused by the continuous braking mechanism than would be required to normally perform the function of the machine.

It is therefore one of the principal objects of my invention to overcome these difficulties by providing an improved and simplified clutch and braking mechanism.

A further object of the invention is to provide a combination clutch and braking mechanism which will cooperate in a manner to improve and increase the efficiency as well as the life of the machine.

A still further object of the invention is to provide a clutch mechanism which is simultaneously actuated with a braking mechanism in such a manner that when the clutch is engaged, the braking mechanism is disengaged and vice versa.

A still further object of the invention is to provide an improved clutch and braking mechanism whereby a single spring is connected in such a manner as to actuate the braking mechanism and automatically disengage the clutch mechanism.

These and other objects are accomplished by providing a construction and arrangement of the various parts in the manner hereinafter described and particularly pointed out in the appended claims.

Referring to the drawings, Fig. 1 is a side elevational view of a perforating machine showing my improved clutch and braking mechanism mounted therein.

Fig. 2 is a cross sectional view of the braking and clutch mechanism taken on the line 2—2 in Fig. 1, looking in the direction indicated by the arrows.

Fig. 3 is an enlarged side elevational view partly in section showing the position of the foot treadle and braking mechanism together with their related parts when the braking mechanism is exerting a braking action on the moving parts of the machine.

Fig. 4 is an enlarged side elevational view similar to that shown in Fig. 3 showing the foot treadle depressed and the manner in which the same disengages the braking mechanism from the moving parts of the machine.

Fig. 5 is an enlarged front elevational view of the intermittently operated clutch discs.

Fig. 6 is a cross sectional view taken on the lines 6—6 in Fig. 5, showing the relative position of the clutch controlling member with respect to the clutch pin.

Fig. 7 is an enlarged diagrammatic view showing the relative position of the continuously operating and intermittently actuated clutch members together with the relative position of the clutch pin with respect to all of these members.

Fig. 8 is an enlarged perspective view of the clutch pin.

Fig. 9 is an enlarged detail view of the continuously rotating clutch member or gear.

Fig. 10 is a cross sectional view taken on the lines 10—10 in Fig. 4, looking in the direction indicated by the arrows, and Fig. 11 is a perspective view of the clutch pin controlling member.

In carrying out my invention I have shown the same embodied in a perforating machine which is used in connection with perforating paper and the like. It will, of course, be understood that my improved clutch and braking mechanism may be readily used in connection with any type of machine other than a perforating machine where the actuating mechanism completes its operation upon a single cycle of operation, and where it is necessary in the operation of such a machine to so combine the clutch and braking mechanism that the braking mechanism is disengaged while the clutch mechanism operatively connects the actuating mechanism to the source of power and at the completion of the operation of the movable parts of the machine the clutch mechanism is automatically disengaged and the braking mechanism comes into action for stopping the actuating parts of the machine at their normal home position.

For the purpose of illustration, I have shown my invention in connection with a perforating machine comprising main frame members 20, which are provided with the usual bed 21 and perforating head 22. The perforating head 22 is reciprocally mounted on vertical stationary shafts 23 positioned on the opposite sides of the machine. The perforating reciprocatory head 22 is normally actuated in the operation of perforating paper by pitman connections 24 mounted on the opposite sides of the machine. These pitman connections 24 are pivotally connected to the perforating head by studs 25 formed integrally with the head. The bearing members 26 are pivotally secured to the studs 25 in any well known manner and secured to the pitman connection 24, preferably by threaded engagement therewith. The lower ends of the pitman connections 24 are provided with bearing members 27 which in turn are operatively connected with an eccentric or crank portion 28 of the drive shaft 29. The drive shaft 29 extends across the base of the machine and is journalled in bearing portions 30 which are formed integrally with the side frame members 20.

My improved combination clutch and braking mechanism comprises intermittently actuated clutch discs 31 and 32, which are secured to the shaft 29 in any well known manner. These clutch discs 31 and 32 are preferably made integral with each other and are provided with a peripheral groove 33 which is positioned substantially midway between the outer surfaces thereof, as clearly shown in Fig. 5. Extending transverse through these intermittently actuated clutch discs 31 and 32 is a square bore 34, which is positioned with respect to the bottom of the groove 33 in such a manner that substantially one half the bore 34 extends above the bottom of the channel or groove for the purpose hereinafter set forth. Reciprocally mounted in the bore 34 is a clutch pin 35 having its forward end preferably tapered as shown at 36, and its rear end grooved as shown at 37. A portion of the clutch pin 35 is cut away or bevelled adjacent the groove 37 as shown at 38. The clutch pin 35 is normally actuated outwardly toward the continuously operating clutch member or gear by a compression spring 39, which has one of its ends engaging the clutch pin and the other end seated on a plug 40 secured to the intermittently actuated clutch member 31 in any well known manner. Rotatably mounted on the outer end of the shaft 28 adjacent the intermittently actuated clutch member 32 is a continuously operated clutch member or gear 41. The clutch member 41 is provided with, on the side that is normally positioned adjacent the intermittently actuated clutch member 32, ratchet teeth 42. These ratchet teeth 42 are preferably made by inserting high carbon steel pins in bores in this clutch member, as clearly shown in Fig. 9. This construction, of course, permits the replacement of any of these pins should any unnecessary wear ensue. These ratchet teeth 42 are bevelled downwardly, as shown at 43, in advance of each ratchet tooth, see Figs. 7 and 9. By reason of this construction these ratchet teeth 42 are adapted to be engaged by the bevelled end 36 of the clutch pin 35 when the clutch member is actuated to connect the source of power with the actuating or perforating mechanism of the perforating machine. The clutch member 41 is provided with gear teeth 44, which are adapted to mesh with a pinion 45, which, in turn, is mounted on the drive shaft 46 of the motor or source of power 47. The motor 47 is preferably mounted in a recess 48 formed in one of the side frame members 20 and secured therein by bolts 49. One of the side frame members 20 is provided with a downwardly projecting ear 50. Pivotally mounted on a stud 51 secured to the ear 50 is a split friction brake which comprises bands 52 and 53. These friction bands 52 and 53 are provided with Raybestos lining 54 on the inner side thereof, which is adapted to frictionally contact with the peripheral surface of the intermittently actuated clutch disc 31 in such a manner as to break the rotary action of the shaft 29 when the clutch has been disengaged in the manner hereinafter described. The upper end of the braking bands 51 and 52 are provided with projecting portions 55 and 56, respectively, which are spaced with respect to each other and are provided with registering bores 57 and 58, respectively. Secured in the bore 57 of the projecting portion 55 of the semi-circular braking band 52 is a bolt 59, which extends through, and is loosely received in, the bore 58 of the semi-circular band 53. These semi-circular friction bands 51 and 52 are normally and yieldingly pressed toward each other by a compression spring 60 mounted on the bolt 59. The tension of this spring for varying the friction on the band may be adjusted by a nut 61 threaded on the outer end of the bolt 59.

One of the important features of my improved combination clutch and braking mechanism is the provision of a single manually operated means for automatically and simultaneously connecting the actuated mechanism with the source of power and disengaging the braking mechanism on one hand, and automatically disengaging the clutch and braking the actuated mechanism when the same has completed a cycle of operation, on the other hand. This comprises a foot treadle 62 pivoted to a bearing member 63 formed on the side frame member 20 on the machine. This foot treadle 62 is preferably mounted in this bearing by being secured to a shaft 64 on one end thereof and having secured on the other end thereof a crank arm 65 by means of a key 66. The crank arm 65 has secured thereto by means of machine screws 67 a clutch controlling member 68. This clutch and brake controlling member 68 is preferably seated in a socket 69 of the crank arm 65, as clearly shown in Figs. 2 and 3. The free end of the clutch and brake controlling member 68 is provided with a bevelled or tapered portion 70, which is adapted to normally engage the bevelled portion 38 in the groove 37 of the clutch pin 35 in disengaging the clutch pin 35 from the continuously actuating clutch member or gear 41, see Fig. 7. The clutch controlling member 68 has a portion of its lower edge cut away, as shown at 71 so that the clutch controlling member may rest on the base 33' of the groove 33 between the intermittently actuated clutch discs 31 and 32, where it is normally positioned and adapted to be actuated in disengaging the clutch pin. Secured by means of rivets 68' to the upper and free end of the clutch and brake controlling member 68 is a wedge member 72, which has its outer edges inclined, as shown at 73. These outer edges 73 of the wedge member 72 are positioned between and adapted to engage pins 74 and 75, which are secured to the projecting portions 55 and 56 of the semi-circular friction bands 52 and 53, respectively.

From the above description it will be seen that as the foot treadle 62 is depressed downwardly about its bearing 63 the clutch and brake controlling member 68 is swung upwardly, thereby withdrawing the lower edge of the clutch controlling member 68 from the groove 37 of the clutch pin 35 and permitting the forward end 36 of the clutch pin 35 to engage the ratchet teeth 42 of the continuously rotating clutch member or gear 41 in such a manner that the source of power or motor 47 through the driving pinion 45 is operatively connected to the actuating or perforating head 22 for operatively driving the same through the pitman connections 24. Simultaneously with the disengaging of the clutch, as previously described, the wedge member 72 mounted on the brake and clutch controlling member 68 is swung upwardly between the pins 74 and 75 and thereby forces the semi-circular friction bands 52 and 53 outwardly about their pivots 51 against the tension of the spring 60 and releases the friction or braking action on the operative parts of the machine during the time the machine is performing its function of perforating the paper.

From this construction it will be also noted that the spring 60, which normally compresses the semi-circular friction bands 52 and 53 for exerting the braking action on the intermittently actuated clutch member 31, breaks the momentum of the operative parts of the machine, thus performing an additional function of forcing the wedge member 72 downwardly, which in turn forces the clutch controlling member 68 also downwardly into the position in which the curved portion 71 engages the base 33' of the groove 33 and when the intermittently actuated clutch members 31 and 32 are completing their cycle of operation the bevelled portion 70 of the clutch controlling member 68 will engage the bevelled edge 38 of the clutch pin 35 and withdraw the clutch pin 35 from the ratchet teeth 42 of the continuously actuated clutch member 41, and thereby disconnecting the source of power from the operative parts of the machine. Of course, as the clutch controlling member 68 is forced downwardly about its pivot in the bearing 63 by the spring 60 the foot treadle 62 will be swung upwardly so as to be in position for the next operation.

While I have described and illustrated my combined clutch and braking mechanism used in connection with a perforating machine, it will, of course, be understood that this mechanism may be used in connection with various types of machines other than perforating machines, in which a similar action of the operative parts is required, and it is therefore within the contemplation of my invention to cover all such constructions.

What I claim as my invention and desire to secure by Letters Patent is:

1. A machine of the class described, in combination with a frame, of an actuated mechanism mounted thereon, a shaft mounted on said frame and operatively related to said actuating mechanism, a source of power for driving said shaft, a clutch mechanism interposed between said source of power and said shaft for connecting and disconnecting said source of power and said shaft, a braking mechanism operatively related to said clutch mechanism for braking the movement of said actuating mechanism and single manually actuating means for releasing said clutch mechanism with said source of power.

2. A machine of the class described, in combination with a frame, of an actuated mechanism mounted thereon, a shaft mounted on said frame and operatively related to said actuating mechanism, a source of power for driving said shaft, a clutch mechanism interposed between said source of power and said shaft for connecting and disconnecting said source of power and said shaft, a braking mechanism operatively related to said clutch mechanism, automatically actuated means whereby said braking mechanism and said clutch mechanism are simultaneously actuated for disconnecting the source of power from said shaft and brake the movement of said shaft and single manually actuating means for releasing said braking mechanism and for operatively connecting said clutch mechanism with said source of power.

3. A machine of the class described, in combination with a frame, of an actuated mechanism mounted thereon, a shaft mounted on said frame and operatively related to said actuating mechanism, a source of power for driving said shaft, a clutch mechanism interposed between said source of power and said shaft for connecting and disconnecting said source of power and said shaft, a braking mechanism operatively related to said clutch mechanism, and single actuating means whereby said braking mechanism and said clutch mechanism are simultaneously actuated for disconnecting the source of power from said shaft and braking the movement of said shaft.

4. A machine of the class described, in combination with a frame, of an actuated mechanism mounted thereon, a shaft mounted on said frame and operatively related to said actuating mechanism, a source of power for driving said shaft, a clutch mechanism interposed between said source of power and said shaft for connecting and disconnecting said source of power and said shaft, a braking mechanism operatively related to said clutch mechanism, and manually operable means whereby said braking mechanism and said clutch mechanism are simultaneously actuated for disconnecting the source of power from said shaft and braking the movement of said shaft.

5. A machine of the class described, in combination with a frame, of an actuated mechanism mounted thereon, a shaft mounted on said frame and operatively related to said actuating mechanism, a source of power for driving said shaft, a clutch mechanism interposed between said source of power and said shaft for connecting and disconnecting said source of power and said shaft, a braking mechanism operatively related to said clutch mechanism, and a foot treadle mechanism operatively connected with said clutch mechanism and said brake mechanism for simultaneously actuating both of said mechanisms.

6. A perforating machine comprising a frame, perforating mechanism mounted on said frame, a shaft mounted on said frame and operatively related to said perforating mechanism, a source of power for driving said shaft, a clutch mechanism interposed between said source of power and said shaft for connecting and disconnecting said source of power and said shaft, a braking mechanism operatively related to said clutch mechanism for braking the movement of said perforating mechanism and a common control for said clutch mechanism and said braking mechanism.

7. A machine of the class described in combination with a frame, of a perforating mechanism mounted thereon, a shaft mounted on said frame and operatively related to said perforating mechanism, a source of power for driving said shaft, a clutch mechanism interposed between said source of power and said shaft including a continuously actuated clutch member, a braking mechanism operatively related to said clutch mechanism, and an intermittently actuated clutch member, means for connecting said continuously actuated clutch member with said intermittently actuated clutch member, a braking mechanism operatively connected to said intermittently actuated clutch member, and a common control means for simultaneously controlling both of said mechanisms.

8. A machine of the class described in combination with a frame, of a perforating mechanism mounted thereon, a shaft mounted on said frame and operatively related to said perforating mechanism, a source of power for driving said shaft, a clutch mechanism interposed between said source of power, and said shaft including a continuously actuated clutch member and an intermittently actuated clutch member, means for connecting said continuously actuated clutch member with said intermittently actuated clutch member, a braking mechanism operatively connected to said intermittently actuated clutch member, and means operatively connected to said first named means and to said 'braking mechanism for controlling both of said mechanisms.

9. A machine of the class described in combination with a frame, of a perforating mechanism mounted thereon, a shaft mounted on said frame and operatively related to said perforating mechanism, a source of power for driving said shaft, a clutch mechanism interposed between said source of power and said shaft including a continuously actuated clutch member and an intermittently actuated clutch member, means for connecting said continuously actuated clutch member with said intermittently actuated clutch member, braking mechanism operatively connected to said intermittently actuated clutch member, and a foot treadle operatively connected to said first named means and said braking mechanism.

10. A machine of the class described in combination with a frame, of a perforating mechanism mounted thereon, a shaft mounted on said frame and operatively related to said perforating mechanism, a source of power for driving said shaft, a clutch mechanism interposed between said source of power and said shaft including a continuously actuated clutch member, and an intermittently actuated clutch member, a reciprocable pin for connecting said continuously actuated clutch member with said intermittently actuated clutch member, a braking mechanism operatively connected to said intermittently actuated clutch member, and a foot treadle operatively connected with said pin and said braking mechanism.

11. A machine of the class described in combination with a frame, of a perforating mechanism mounted thereon, a shaft mounted on said frame and operatively related to said perforating mechanism, a source of power for operatively driving said shaft, a clutch mechanism interposed between said shaft and said source of power including an intermittently actuated clutch member and a continuously actuated clutch member, a reciprocably actuated clutch pin mounted in said intermittently actuated clutch member and adapted to engage said continuously actuated clutch member, a braking mechanism operatively connected with said intermittently actuated clutch member, and a foot treadle operatively connected with said clutch pin and with said braking mechanism whereby both of said mechanisms are alternately actuated to perform their respective functions of braking the momentum of moving parts of the machine and connecting the source of power with the moving parts of the machine.

12. A machine of the class described in combination with a frame, of a perforating mechanism mounted thereon, a shaft mounted on said frame and operatively related to said perforating mechanism, a source of power for operatively driving said shaft, a clutch mechanism interposed between said shaft and said source of power including an intermittently actuated clutch member and a continuously actuated clutch member, a reciprocably actuated clutch pin mounted in said intermittently actuated clutch member and adapted to engage said continuously actuated clutch member, a braking mechanism operatively connected with said intermittently actuated clutch member, and a foot treadle operatively connected with said clutch pin and with said braking mechanism whereby both of said mechanisms are alternately simultaneously actuated to perform their respective functions of braking the momentum of moving parts of the machine and connecting the source of power with the moving parts of the machine.

13. A machine of the class described in combination with a frame, of a perforating mechanism mounted thereon, a shaft mounted in said frame and operatively related to said perforating mechanism, a source of power for operatively driving said shaft, a clutch mechanism interposed between said shaft and said source of power including an intermittently rotatable clutch member mounted on said shaft, a continuously rotatable clutch member journalled on said shaft, a clutch pin mounted in said intermittently rotated clutch member for reciprocatory movement, said clutch pin having a transverse groove therein, a friction brake mechanism operatively connected with said intermittently rotated clutch member, and a manually controlled member adapted to engage the groove in said clutch pin and operatively connected with said friction brake mechanism for simultaneously controlling said brake and clutch mechanisms.

14. A machine of the class described in combination with a frame, of a perforating mechanism mounted on said frame, a shaft mounted in said frame and operatively related to said perforating mechanism, a source of power for operatively driving said shaft, a clutch mechanism positioned between said source of power and said shaft including an intermittently rotatable clutch member and a continuously rotatable clutch member, a reciprocably mounted clutch pin for operatively connecting said clutch members together, a braking mechanism including a plurality of semi-circular brake bands adapted to frictionally engage said intermittently rotated clutch member, and a control member alternately engageable with said clutch pin and said brake bands for controlling said clutch mechanism and said braking mechanism.

15. A machine of the class described in combination with a frame, of a perforating mechanism mounted on said frame, a shaft mounted in said frame and operatively related to said perforating mechanism, a source of power for operatively driving said shaft, a clutch mechanism positioned between said source of power and said shaft including an intermittently rotatable clutch member and a continuously rotatable clutch member, a reciprocably mounted clutch pin for operatively connecting said clutch members together, a braking mechanism including a plurality of semi-circular brake bands adapted to frictionally engage said intermittently rotated clutch member, and a spring operatively connected to said brake bands and for returning said control member to normal position.

16. A machine of the class described in combination with a frame, of a perforating mechanism mounted on said frame, a shaft mounted in said frame and operatively related to said perforating mechanism, a source of power for operatively driving said shaft, a clutch mechanism positioned between said source of power and said shaft including an intermittently rotatable clutch member, and a continuously rotatable clutch member a reciprocably mounted clutch pin for operatively connecting said clutch members together, a braking mechanism including a plurality of semi-circular brake bands adapted to frictionally engage said intermittently rotated clutch member, oppositely positioned pins carried by said brake bands, and a control member alternately engageable with the pins on said bands and with said clutch and braking mechanism.

17. A machine of the class described, in combination with a frame, of an actuating mechanism mounted thereon, a shaft mounted on said frame and operatively related to said actuating mechanism, a source of power for driving said shaft, a clutch mechanism interposed between said source of power and said shaft for connecting and disconnecting said source of power with said shaft, a braking mechanism operatively related to said clutch mechanism, an automatically actuated means whereby said braking mechanism and said clutch mechanism are simultaneously actuated for disconnecting the source of power from said shaft and braking the movement of said shaft.

In testimony whereof I have signed my name to this specification.

ERNEST LESCHHORN.